United States Patent [19]
Nolf

[11] 4,289,553
[45] Sep. 15, 1981

[54] HEAT-SHRINKABLE ARTICLE

[75] Inventor: Jean-Marie E. Nolf, Beauvechain, Belgium

[73] Assignee: N.V. Raychem S.A., Kessel-lo, Belgium

[21] Appl. No.: 955,537

[22] Filed: Oct. 30, 1978

[30] Foreign Application Priority Data

Nov. 8, 1977 [GB] United Kingdom ............... 46516/77

[51] Int. Cl.³ .................... B29C 27/00; B32B 31/00; H01R 4/00; H02G 13/06
[52] U.S. Cl. ................................. 156/86; 174/84 R; 174/DIG. 8; 428/36
[58] Field of Search ..................... 174/84 R, DIG. 8; 156/85, 86; 428/36

[56] References Cited

U.S. PATENT DOCUMENTS

| | | | |
|---|---|---|---|
| 3,035,113 | 5/1962 | Danchuck | 174/DIG. 8 |
| 3,205,467 | 9/1965 | Ganci | 174/DIG. 8 |
| 3,312,772 | 4/1967 | Sherlock | 174/DIG. 8 |
| 3,396,460 | 8/1968 | Wetmore | 174/84 R |
| 3,398,369 | 8/1975 | Clabburn | 174/DIG. 8 |
| 3,669,824 | 6/1972 | Hess | 174/DIG. 8 |
| 3,849,864 | 11/1974 | Plummer | 174/DIG. 8 |
| 3,985,950 | 10/1976 | Maltz | 174/DIG. 8 |
| 4,016,356 | 4/1977 | McLoughlin | 174/DIG. 8 |
| 4,118,260 | 10/1978 | Boettcher | 156/85 |
| 4,142,592 | 3/1979 | Brusselmans | 156/86 |
| 4,144,404 | 3/1979 | DeGroef et al. | 174/84 R |

FOREIGN PATENT DOCUMENTS

| | | | |
|---|---|---|---|
| 1053602 | 3/1959 | Fed. Rep. of Germany | 174/84 R |
| 1245119 | 9/1971 | United Kingdom | 174/DIG. 8 |
| 1418895 | 12/1975 | United Kingdom . | |
| 1422290 | 1/1976 | United Kingdom . | |
| 1479049 | 7/1977 | United Kingdom . | |

Primary Examiner—William R. Dixon, Jr.
Attorney, Agent, or Firm—Lyon & Lyon

[57] ABSTRACT

A heat-recoverable article, especially a heat-shrinkable polymeric sleeve, is provided with an inner lining of a continuous metal foil to provide protection against inward water vapor transmission. The lining is preferably aluminium foil having a thickness of from 10 to 25 microns and is thus sufficiently thin that, on recovery, it leads to an even surface configuration without itself tearing or otherwise being damaged. The article is also preferably provided with central reinforcing means comprising one or more longitudinally compressible coils and is especially useful in the protection and insulation of splices in communication cables.

32 Claims, 13 Drawing Figures

HEAT-SHRINKABLE ARTICLE

This invention relates to heat-recoverable articles, especially heat-shrinkable articles for use in the protection and insulation of supply lines such as electric cables.

Heat-recoverable articles, especially heat-shrinkable articles, are now widely used in many areas where insulation, sealing and encapsulation are required. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Heat-shrinkable sleeves find many applications, especially in the connection and termination of wires, cables and pipes. However, there are other applications where it is desirable to provide a connecting, insulating or protective heat-recoverable member for elongated objects such as cables and pipes where the ends are not accessible or, if they are accessible, where it is undesirable to disconnect or otherwise displace them. For such applications so-called "wrap-around" sleeves have been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protuberances adjacent to the overlapping edges of the heat-recoverable sheet. Various types of fastening means are described, for example, in U.S. Pat. No. 3,379,218 and British Pat. Nos. 1,155,470; 1,211,988 and 1,346,479. In other applications the sheet may be held in the wrapped-up configuration during recovery by means of an adhesive which may, in some cases, be applied on site.

One particular area of application of heat-recoverable articles of the type described above is in the insulation and protection of junctions between supply lines, especially electric cables. In making such junctions, for example, between telephone or power cables, many problems arise in meeting the necessary requirements of continuity of insulation and earthing, of sealing the joint against the ingress of contaminants such as moisture and insects and in providing the necessary strength of resistance to tension, compression, flexing and impact. British Pat. No. 1,155,470 proposes to use tubes or sleeves of heat-shrinkable material to protect and insulate joints in the electric cables. However, because the cables are frequently pressurised and must be waterproof it is necessary to coat the inner wall of the heat-shrinkable sleeve with a sealant such as a hot-melt adhesive or a mastic. When the sleeve is heated the sealant melts and forms a water-tight and pressure-tight seal between the sleeve and the cable. This has the disadvantage that, in certain cases, the sleeves cannot subsequently easily be opened for repair or modification of the joint without necessitating the complete renewal of the junction and the method is also unsuitable where the joint or the electric components leading to the joint comprise components which are delicate or frangible.

It has, therefore, been proposed to provide modified heat-shrinkable articles in which a central portion does not recover or in which reinforcement means are provided to prevent recovery in the central region. For example, British Pat. No. 1,248,908 discloses a heat-shrinkable article containing a bridging sleeve of non-recoverable material and terminal sleeves of heat-shrinkable material, the sleeves being connected to one another, for example, by screw connections. However, such an arrangement requires relatively close tolerances in manufacture to ensure that the male and female screw threads of the parts are readily engageable.

A more successful proposal is that of British Pat. No. 1,431,167 in which a heat-shrinkable sleeve, which may be a wrap-around sleeve is provided with central reinforcement comprising a relatively rigid longitudinally split tube. Typically such a tube is made from a pair of semi-cylindrical half shells, for example made from aluminium. Such articles have the advantage that they may easily be re-opened for repair work or modification of a cable joint but they have proved rather expensive.

The present invention provides a heat-recoverable article which comprises a heat-shrinkable, preferably tubular, sleeve having an inner lining of a continuous metal foil and provided with central reinforcing means comprising one or more longitudinally compressible coils.

The present invention is based on our surprising observation that the combination of the thin metal foil lining and the centrally positioned coil(s) provides an inexpensive, but highly efficient, means (a) for ensuring that, after recovery, a cable joint is effectively sealed against inward water vapour transmission and (b) for ensuring that the recovered article has the desired mechanically strong tubular construction in its central region.

The use of reinforcement means in heat-recoverable feed-through devices is described in British Pat. No. 1,245,119 and one reinforcement means proposed is a coil member, but the use of a coil in those devices is mainly to provide a screw like outer surface to the article after recovery to facilitate insertion of the feed-through device within and removal of the device from a wall through which it passes. On the other hand, an important feature of the coil or coils used in the present invention is that, whilst they are strong enough to provide the required mechanical properties to the central region (which, in one test, should be able to resist, without collapsing, the force of a 0.5 kg steel cylinder with a spherical end which is dropped onto the article from a height of 1 meter), they are, on the other hand, longitudinally compressible, that is to say, the coil(s) can be compressed by hand or by using a simple hand tool. Thus, when it is desired to repair or modify the cable joint the heat-shrinkable sleeve can be cut and removed and the coil(s) can be longitudinally compressed so as to allow access to the joint. Once repair or modification has been effected the coil(s) can return to their former configuration. It is, therefore, preferred that the coil(s) should be resilient so as to facilitate this procedure. In one embodiment, for example, a single helical spring may be employed which can be pulled back from one end so as to allow access. However, when only one coil is used there may be problems in accommodating the shape of the fully compressed coil and, in addition, it may not be possible, in some instances, to compress the coil sufficiently to allow access to all components of the cable splice.

In an especially preferred embodiment, therefore, the reinforcement is provided by two coils arranged in end-to-end arrangement so that after recovery, they provide an effective replacement for a single coil. One or both of said coils may be provided with means for properly locating them prior to recovery. For example, one of the coils may be provided with a short tubular attachment into or around which the other coil may be positioned. When, as in the preferred embodiments, the coils are resilient, clamps may be provided to hold them in the compressed state upon re-entry of the joint.

The articles of the present invention may advantageously be provided with support means for ensuring that the splice remains properly located within the central region during and after recovery. Such means may, for example, be small metal bands positioned at the ends of the coil(s). Preferably, however, the means comprise "crowns" or "combs" as described and illustrated, for example, in British Pat. No. 1,431,167. These generally comprise a metal band having a plurality of deformable tines or prongs extending therefrom. The prongs are preferably more deformable towards their ends and their presence ensures a smooth gradation of the diameter of the heat-shrinkable sleeve from the reinforced central portion to the point at which it grips the cable, thus minimising stress on the sleeve materials, and the prongs act to reinforce this region of changing diameter. Of course, the crowns may be used in conjunction with other support means but this is not generally necessary.

The heat-shrinkable tubular sleeve may have a closed cross-section or may be a wrap-around sleeve as described in the Patents referred to above. The term "tubular" as used herein is not limited to members of right cylindrical configuration, but includes members of irregular and/or varying cross-section as well as Y-shaped, T-shaped and X-shaped members.

The sleeve may, of course, be made from any of the heat-recoverable materials known in the art, but amongst especially preferred materials there may be mentioned, for example, polyolefins, especially polyethylene, copolymers of ethylene and vinyl acetate, copolymers of ethylene and ethyl acrylate; chlorinated and fluorinated polymers, especially polyvinyl chloride, polyvinylidene fluoride and polymers incorporating units from vinylidene fluoride, hexafluoroethylene and chlorotrifluoroethylene; and rubbers such as ethylene/propylene rubber, chlorinated rubbers, e.g. Neoprene, and silicone rubbers which may be used in a blend with a crystalline or glassy polymer such as an olefin polymer. All of the above materials may, if desired, be crosslinked for example by irradiation and/or chemical means. The sleeve will generally be provided at at least its ends with an inner coating of a sealant such as a hot-melt adhesive or a mastic although, in certain applications, these may be applied on site. Especially suitable hot-melt adhesives include, for example, polyamides, ethylene/vinyl acetate copolymers and terpolymers (with or without incorporated waxes) and polyesters. Such materials are described, for example, in British Pat. No. 1,440,810 and German OS No. 2,709,717. Also suitable are curable adhesives which melt and flow on heating but which will not afterwards be hot-meltable. There may also be mentioned epoxy resins and conventional mastics such, for example, as those based on butyl and isobutylene rubbers modified with suitable materials known in the art. Obviously the use or otherwise of such materials and their type, if chosen, will depend upon the particular requirements in any given case.

As mentioned above, an especially important aspect of the present invention is the provision of the continuous metal foil lining to provide protection against inward water vapour transmission. In the heat-shrinkable articles described in British Pat. No. 1,431,167 there is a possibility of water entering between the prongs of the crowns at both ends and, in any case, the water vapour permeability of the polymeric material typically employed for the heat-recoverable sleeve is high and thus leads to the need for the use of silica gel bags within the splice case at installation. In the preferred articles of the present invention, however, the metal foil covers up the splice between the prongs of the crown after recovery and extends all the way to the end of the heat-shrinkable tubular sleeve. Comparative water vapour permeability tests suggest that the arrangement according to the present invention leads to a reduction in water vapour permeability by a factor of about 8 as compared with the previously proposed product using aluminium half shells. Not only is this surprising improvement obtained, but also it has been found that by choosing the correct thickness of the metal foil, which in general will be an aluminium foil, it is possible to obtain a heat-shrinkable product which will recover to give an even surface configuration, but in which there is no tearing of the metal foil. That is to say, the metal foil is sufficiently thin that it does not buckle and adopt a shape exhibiting such peaks and valleys which might, for example, lead to damage to the heat-shrinkable sleeve or provide a path for the ingress of contaminants. On the other hand, the metal foil is not so thin that it is damaged, e.g. torn, during recovery, even about substrates of irregular shape.

Using aluminium foil we have found that a desirable range of thickness is from 10 to 25 microns, especially from 12 to 15 microns. Other metal foils which may be employed at similar thicknesses include copper foil, soft iron foil (e.g. where magnetic shielding is required) and certain metallised plastics foils such as the commercially available biaxially oriented polyester foil coated with gold.

In one aspect, therefore, the present invention also provides a heat-recoverable article which comprises a heat-shrinkable tubular sleeve provided with an inner lining of a continuous metal foil having an appropriate thickness as described above, especially an aluminium foil having a thickness of from 10 to 25 microns, preferably from 12 to 15 microns. In one especially preferred embodiment of this aspect of the invention, a heat-shrinkable tube provided with an inner layer of a hot-melt adhesive is provided with an inner lining of a metal foil of the appropriate thickness which is itself provided with an internal coating of a hot-melt adhesive. Such a product has been found to be especially useful in encapsulating cable splices, in wrap-around products and in making transitions from cable box outlets to incoming cables.

In this aspect of the present invention one tubular sleeve may be one of closed cross-section or may be a wrap-around sleeve. In the case of a wrap-around sleeve the metal foil may readily be applied either during or after the manufacture of the sleeve. For example, the sleeve are typically coated with a hot-melt adhesive at some stage of their manufacture, and the metal foil, if desired, with its pre-applied layer of hot-melt adhesive, may be applied to the sleeve whilst the hot-melt adhesive on the sleeve is still tacky. The provision of an inner foil on tubular products of closed cross-section is more difficult, but, in the case of tubes of small diameter it may be provided by a co-extrusion process and in the case of tubes of larger diameter, it may be applied by using a collapsible mandrel. For example, a mandrel may be formed from two cylindrical half shells which are internally hinged together, for example by a piano hinge, one of the shells having a slightly smaller diameter so that it fitted inside the other to collapse the mandrel. Such a mandrel may be coated with a release plastic and covered with, for example, aluminium foil with or without a hot-melt adhesive layer, and a heat-shrinkable tubular sleeve provided with an inner layer of a hot-melt adhesive may then be partially shrunk down about the mandrel and then allowed to cool. After cooling the mandrel may be collapsed as described above and removed to leave the desired laminated product. When one or more coils is also to be incorporated these may be positioned over the release plastic (which may, for example, be a blend of a polyethylene with a silicon based polymer) prior to application of the aluminium foil. In this respect we have surprisingly observed that the aluminium foil lays itself neatly on the coil after shrinkage without tearing.

It has been proposed previously to provide heat-shrinkable articles with internal metal linings for electrical and structural purposes in, for example, British Pat. No. 1,482,918 and U.S. Pat. No. 3,312,772. However, the metal lining proposed in British Pat. No. 1,482,918 is longitudinally corrugated and is mainly capable of compression only in a direction allowed by the corrugation. In addition the corrugations may lead to damage of the heat-recoverable sleeve or of a substrate, a danger which is specifically mentioned in the British Patent, and there is no suggestion that a simple uniform lining of a metal foil as proposed by the present invention could lead to the surprising properties mentioned above. There is also no suggestion of a three or four part laminate article comprising one or two layers of a hot-melt adhesive or of securing the metal lining to the recoverable sleeve by means of such an adhesive.

The metallic foil insert proposed in U.S. Pat. No. 3,312,772 is present in a protective capacity and clearly would not shrink uniformly with the recoverable sleeve. It is not, in any case, provided as a continuous internal lining bonded to or closely fitting within the recoverable member. The latter remarks also apply to the corrugated sheath disclosed in British Pat. No. 1,482,918 where it is specifically stated that the heat-shrinkable sleeve is preferably longer than the corrugated sheath in order to provide the necessary barrier at the ends against contaminants. In accordance with the present invention the metal lining extends continuously throughout the heat-recoverable sleeve right to the ends thereof. Not only have we found that such an arrangement is quite capable of providing the necessary seal at the ends after recovery, but also the fact that the lining extends to the ends of the heat-shrinkable sleeve has important advantages especially in electrical applications where continuity of screening may be required.

In summary, therefore, in this aspect of the present invention there is provided a heat-recoverable laminate consisting of heat-recoverable polymeric sheet material having a lining of a metal foil over at least substantially the whole of its surface, the metal lining being arranged so as to lie in the direction of recovery of the heat-recoverable material and having a thickness such that it allows uniform recovery without damage either to itself or to the heat-recoverable material.

One final preferred feature of the articles of the present invention is the provision of a self-contained cutting means so as to facilitate removal of at least the central part of the article when re-entry is desired. Because of the coil arrangement the use of a knife to cut the heat-recoverable sleeve/metal foil laminate is rather difficult because there is no continuous surface to support the tip of the knife, which could damage the splice, and the windings of the coil prevent a smooth cutting movement. In a preferred embodiment, therefore, the article is provided with a thin metal wire, e.g. a piano steel wire of a diameter of about 0.6 mm which is pre-installed longitudinally between the coil(s) and the foil. Especially when the article is preheated we have found that a smooth longitudinal cut through the laminate may be obtained merely by pulling the wire away from the coil(s). Circular cuts beyond the ends of the central section can, of course, be performed in the usual way with a knife if metal support rings are provided, but it is possible so to wind the wire that it can also perform this function. The wire is preferably provided with a small terminal ring which is located on the outside of the heat-recoverable article and which may be cut out after local heating or otherwise removed and pulled to effect the desired cutting.

Various embodiments of the present invention will now be described, by way of example only, with reference to the accompanying drawings, in which FIG. 1 illustrates a reinforcing means;

FIG. 10b is an end view of the sleeve of FIG. 10a; and

FIG. 10c is a longitudinal section through the sleeve shown in FIG. 10a.

Figure 1:
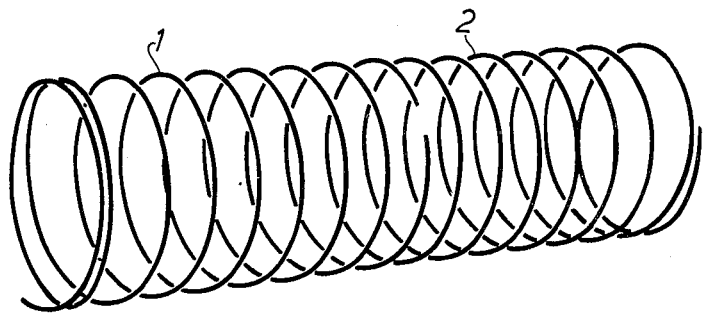
Figure 2:
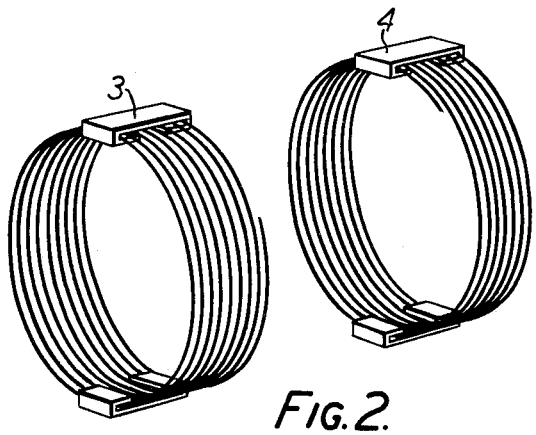
FIG. 2 shows the reinforcing means of FIG. 1 in the longitudinally compressed state.

Referring now to the drawings, in FIG. 1 there is shown reinforcing means suitable for use in the present invention. The reinforcing means comprises two coils 1 and 2 in end-to-end relationship. As shown in FIG. 2, the coils 1 and 2 are resiliently longitudinally compressible and may be held in the longitudinally compressed state by means of clamps 3 and 4, respectively, when re-entry is desired.

Figure 3A:
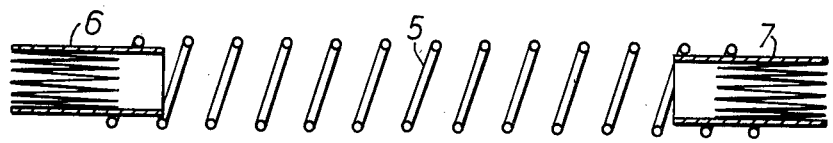
FIG. 3a is a longitudinal section through a reinforcing means provided with support rings and crowns on each of its ends.
Figure 3B:
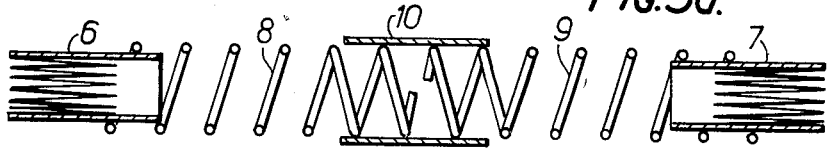
FIG. 3b is a longitudinal section through a somewhat similar reinforcing means.

FIG. 3a shows a reinforcing means comprising a single resiliently longitudinally compressible coil 5 provided at each of its ends with support crowns 6 and 7 as described in British Pat. No. 1,431,167. In FIG. 3b there is shown a somewhat similar reinforcing means in which two resiliently longitudinally compressible coils 8 and 9 are arranged in end-to-end relationship, coil 8 being provided with a short copper tube 10 into which coil 9 extends for correct positioning.

Figure 4:
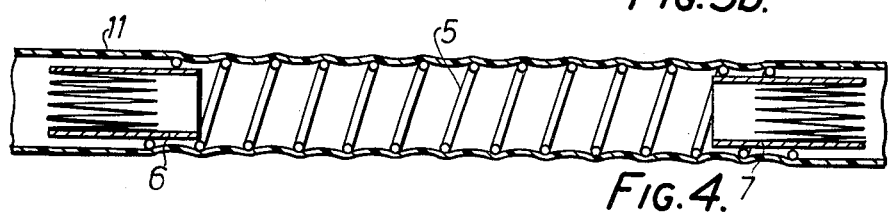
FIG. 4 is a longitudinal section through a device comprising the reinforcing means of FIG. 3a positioned within a heat-shrinkable sleeve.

FIG. 4 shows a heat-recoverable article according to the present invention in which the reinforcing means of FIG. 3a is positioned within a heat-shrinkable sleeve 11 which has been partially shrunk down about the reinforcing means in the central region.

Figure 5:
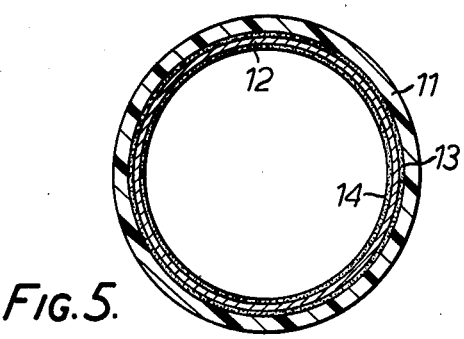
FIG. 5 is an end view of the heat-shrinkable sleeve of FIG. 4.
Figure 6:
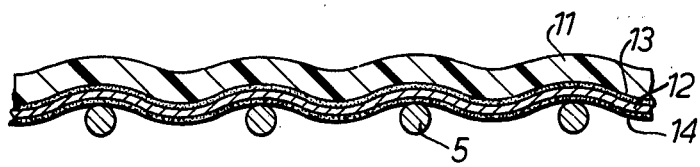
FIG. 6 is a magnified partially longitudinal section of the device shown in FIG. 4.

As shown in FIGS. 5 and 6, the sleeve 11, which is made from cross-linked polyethylene having a thickness of about 2.3 mm, is provided with an inner lining 12 of aluminium foil of a thickness of about 15 microns. A layer of hot-melt adhesive 13 is provided between the lining and the foil which is itself coated on its inner surface with a further layer of hot-melt adhesive 14.

As shown in FIG. 6, the heat-recoverable sleeve 11 and the lining 12 conform to the shape of the coil, but the foil lining does not tear.

Figure 7:
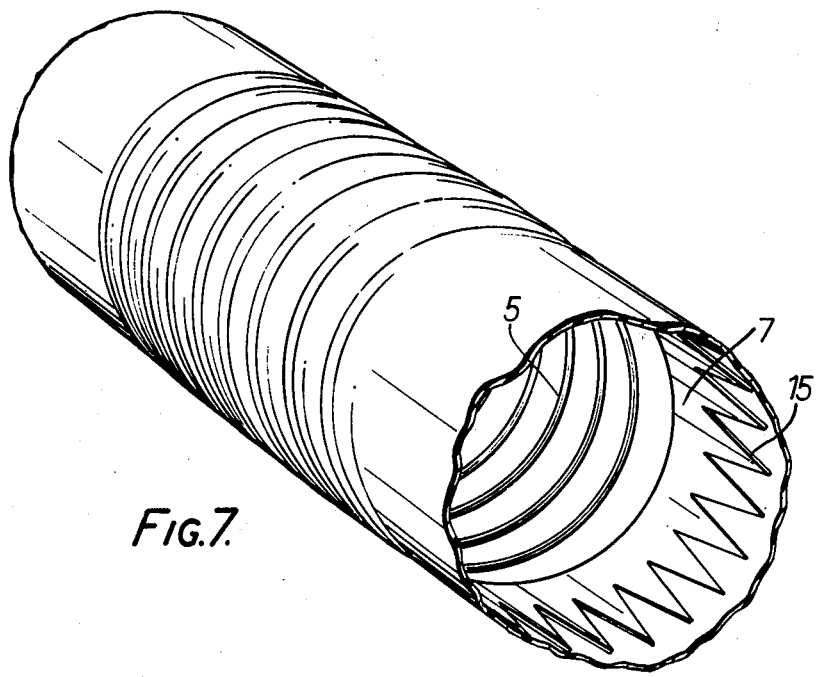
FIG. 7 is a view of the device shown in FIG. 4.

Another view of the device of FIG. 4 is shown in FIG. 7 in which the prongs 15 of the terminal crown 7 are more clearly visible.

Figure 8:
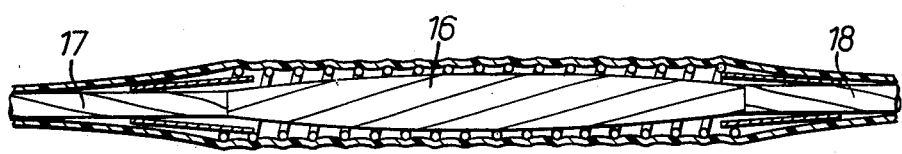
FIG. 8 is a longitudinal section through an encapsulated joint made using the device of FIG. 4.

FIG. 8 shows the device of FIG. 4 after it has been positioned about and shrunk over a junction 16 between two cables 17 and 18. As can be seen, the provision of the crowns ensures a smooth change in diameter from the central region to the end region thus ensuring that no undue stress on the heat-recoverable material occurs at the ends of the central region.

Figure 9:
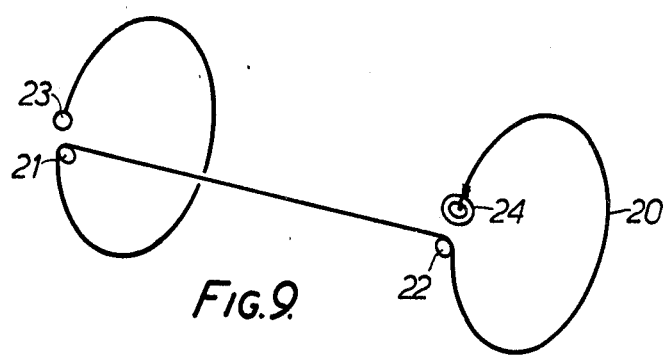
FIG. 9 illustrates self-contained cutting means suitable for use with the device of FIG. 4.

FIG. 9 shows how a length of piano steel wire may be wound inside the heat-recoverable sleeve and its metal foil lining so that the desired cutting action can be readily obtained when it is desired to re-enter the junction. As shown, the wire 20 is wound about two supports 21 and 22 which may be provided on the reinforcing means and is anchored at one end 23. At the other end it is provided with a ring 24 which is accessible from the outside of the heat-shrinkable sleeve and which may be pulled to produce the required circular and longitudinal cuts through the sleeve and its lining.

Figure 10A:
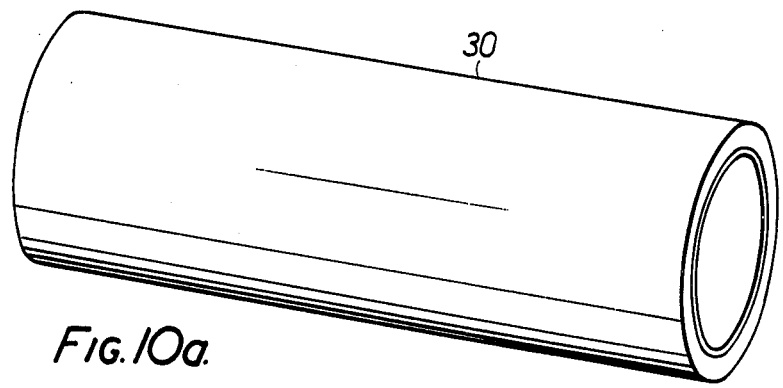
FIG. 10a illustrates a heat-shrinkable sleeve provided with an internal metal foil lining.
Figure 10B:
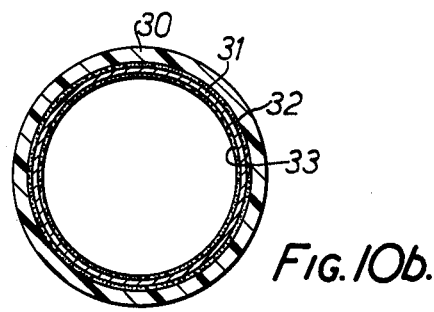
Figure 10C:
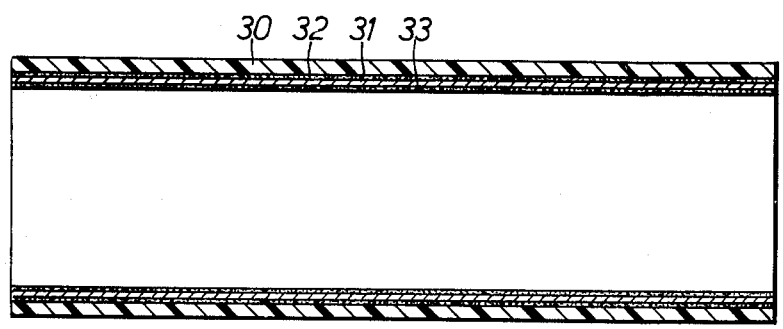

In FIG. 10a there is shown a simple heat-shrinkable sleeve 30 made, for example, from cross-linked high density polyethylene. In accordance with the present invention the sleeve 30 is provided with a continuous inner lining 31 of aluminium foil which has a thickness of from 10 to 25 microns, preferably from 12 to 15 microns, the thickness of the heat-shrinkable sleeve typically being from 1 to 5 mm. As shown more clearly in FIGS. 10b and 10c, two layers of hot-melt adhesive 32 and 33 are provided between the sleeve 30 and the foil 31, and on the inner surface of foil 31, respectively.

Whilst the present invention has been especially described with reference to the formation of joints between electric cables it will, of course, be appreciated that the heat-recoverable articles which it provides will have many other useful applications, especially those in which continuous shielding against water vapour, radiation or magnetic field is required.

I claim:

1. A heat-recoverable article which comprises a heat-shrinkable sleeve having bonded thereto by a layer of hot-melt adhesive a smooth inner lining of a continuous metal foil, the thickness of the foil being selected so that the foil has a visually even surface configuration upon heat shrinkage of the sleeve and which comprises internal reinforcing means comprising at least one longitudinally compressible coil disposed longitudinally within the sleeve.

2. A heat-recoverable article as claimed in claim 1, wherein the coil is resilient.

3. A heat-recoverable article as claimed in claim 1, wherein the central reinforcing means comprises two coils in end-to-end relationship.

4. A heat-recoverable article as claimed in claim 3, wherein at least one coil is provided with means for properly locating it before recovery.

5. A heat-recoverable article as claimed in claim 4, wherein the means for properly locating comprises a tubular attachment capable of locating the coil ends.

6. A heat-recoverable article as claimed in claim 1, which is provided with support means for ensuring that substrates positioned within the sleeve are properly located within the central region during and after recovery.

7. A heat-recoverable article as claimed in claim 6, wherein said support means comprise metal bands with their respective circumferences positioned around the longitudinal axis of the coil at the outer coil ends.

8. A heat-recoverable article as claimed in claim 6, wherein said support means comprises deformable crowns positioned at the outer coil ends.

9. A heat-recoverable article as claimed in claim 6 wherein said support means comprises combs positioned at the outer coil ends.

10. A heat-recoverable article as claimed in claim 1, wherein the heat-shrinkable sleeve has been formed by wrapping of a wrap-around sleeve.

11. A heat-recoverable article as claimed in claim 1 wherein the metal foil lining extends over the internal reinforcing means.

12. A heat-recoverable article as claimed in claim 11, wherein the metal foil lining extends throughout the length of the sleeve.

13. A heat-recoverable article as claimed in claim 1, wherein the metal foil lining is made from aluminium.

14. A heat-recoverable article as claimed in claim 1, wherein the metal foil lining is made from copper.

15. A heat-recoverable article as claimed in claim 1, wherein the heat-shrinkable sleeve is an integral tubular sleeve.

16. A heat-recoverable article as claimed in claim 1, wherein the metal foil lining extends throughout the length of the heat-shrinkable sleeve.

17. A heat-recoverable article as claimed in claim 1, wherein the sleeve has at least one closed end.

18. A heat-recoverable article as claimed in claim 1 or 13, wherein the thickness of the metal foil lining is from 10 to 25 microns.

19. A heat-recoverable article as claimed in claim 18, wherein the thickness of the metal foil lining is from 12 to 15 microns.

20. A heat-recoverable article which comprises a heat-shrinkable sleeve having bonded thereto a smooth inner lining of a continuous metal foil, the thickness of the foil being selected so that it has a visually even surface configuration upon heat shrinkage of the sleeve, wherein the metal foil is bonded to the heat-shrinkable sleeve by a layer of hot-melt adhesive.

21. A heat-recoverable article as claimed in claim 20, wherein the thickness of the metal foil lining is such that it allows recovery of the sleeve without damage to the sleeve.

22. A heat-recoverable article as claimed in claim 20, wherein the metal foil lining is made from aluminium.

23. A heat-recoverable article as claimed in claim 20, wherein the metal foil lining is made from copper.

24. A heat-recoverable article as claimed in claim 20 or 22, wherein the thickness of the metal foil lining is from 10 to 25 microns.

25. A heat-recoverable article as claimed in claim 24, wherein the thickness of the metal foil lining is from 12 to 15 microns.

26. A heat-recoverable article as claimed in claim 1 or 20, wherein the metal foil lining is made from soft iron.

27. A heat-recoverable article as claimed in claim 1 or 20 wherein the metal foil lining is a metallic layer metallized on a layer of plastics material other than the sleeve.

28. A heat-recoverable article which comprises a heat-shrinkable sleeve having a smooth inner lining of a continuous metal foil, the thickness of the foil being selected so that the foil has a visually even surface configuration upon heat shrinkage of the sleeve and which comprises internal reinforcing means comprising at least one longitudinally compressible coil disposed longitudinally within the sleeve wherein the heat-shrinkable sleeve is provided with an inner layer of a hot-melt adhesive.

29. A heat-recoverable article which comprises a laminate of heat-shrinkable sheet material having a smooth inner lining of continuous metal foil over at least substantially the whole of its surface, wherein the foil is selected so that upon shrinkage of the sheet material, the foil has a visually even surface configuration, wherein the metal foil is bonded to the heat-shrinkable sleeve by a layer of hot-melt adhesive.

30. A heat-recoverable article which comprises a heat-shrinkable sleeve having bonded thereto by a layer of hot-melt adhesive a smooth inner lining of continuous metal foil and provided with central reinforcing means, comprising at least one longitudinally compressible coil, the lining being sufficiently thick and strong that upon shrinkage of the sleeve the lining remains continuous and has a visually even surface configuration.

31. A method of joining or encapsulating one or more substrates which comprises the steps of (a) positioning at least one substrate within a heat-shrinkable sleeve having bonded thereto by means of a hot-melt adhesive a smooth inner lining of a continuous metal foil, the thickness of the foil being selected so that it has a visually even surface configuration when the sleeve is shrunk, and (b) heating said sleeve to cause it to shrink down about said substrate and to cause the adhesive to melt, the foil having a visually even surface configuration.

32. A method as claimed in claim 31, wherein the heat-shrinkable sleeve is provided with central reinforcing means comprising at least one longitudinally compressible coil.

* * * * *